United States Patent
Cumisky

[11] Patent Number: 6,101,966
[45] Date of Patent: Aug. 15, 2000

[54] MULTIPURPOSE UTILITY STATION FOR BOAT WITH ADJUSTABLE MOUNT

[76] Inventor: Paul F. Cumisky, 190 E. Shore Dr., Massapequa, N.Y. 11758

[21] Appl. No.: 09/314,388

[22] Filed: May 19, 1999

[51] Int. Cl.[7] .................................................... B63B 17/00
[52] U.S. Cl. ............................................ 114/364; 114/343
[58] Field of Search ................................... 114/272, 343, 114/364

[56] References Cited

U.S. PATENT DOCUMENTS

| | | |
|---|---|---|
| D. 259,603 | 6/1981 | Gagnon . |
| D. 298,226 | 10/1988 | Thomas . |
| D. 366,170 | 1/1996 | Temple . |
| 3,575,481 | 4/1971 | Phileger, Jr. . |
| 4,062,299 | 12/1977 | Smith . |
| 4,086,859 | 5/1978 | Dondero . |
| 4,221,014 | 9/1980 | Davidson . |
| 4,283,869 | 8/1981 | Rappa . |
| 4,353,182 | 10/1982 | Junkas et al. ............................ 43/54.5 |
| 4,582,015 | 4/1986 | Hunter ................................... 114/343 |
| 4,672,898 | 6/1987 | Davidson ................................... 108/6 |
| 4,989,535 | 2/1991 | Lacasse et al. . |
| 5,048,447 | 9/1991 | Vicari . |
| 5,092,263 | 3/1992 | Hutchison et al. ..................... 114/364 |
| 5,197,406 | 3/1993 | Rabal et al. . |
| 5,595,128 | 1/1997 | De Ladurantaye et al. . |

*Primary Examiner*—S. Joseph Morano
*Assistant Examiner*—Andrew D. Wright
*Attorney, Agent, or Firm*—Morey B. Wildes, Esq.; Cowan, Liebowitz & Latman

[57] ABSTRACT

A multifunctional utility station is suitable for use as a utility table, tackle box and/or storage chest and has an adjustable mount can be used on a recreational watercraft or other boat. The multifunctional utility station is affixed to and supported on the boat by at least one support member having a horizontal end and a vertical end, where the horizontal end of each support member is slidably and adjustably positioned within a receiving channel and sleeve situated along the bottom of the station. Position setting means, in the form of either a bolt that cooperates with grooves with position stops formed along the interior of the receiving channels or a toggle bolt or some other device, may be used to set the depth of the station relative to the horizontal end of the support member. The vertical end of each support member is slidably and adjustably positioned within a channel bracket that is affixed to the hull of a fishing or general recreation boat. Position setting means, in the form of a toggle bolt or some other device, may be used to set the height of the station relative to the deck of the boat. The vertical portion of the support member may be further shaped in order to increase its clearance from the side of the boat.

55 Claims, 5 Drawing Sheets

MULTIPURPOSE UTILITY STATION FOR BOAT WITH ADJUSTABLE MOUNT

BACKGROUND

This invention relates to utility stations for use on recreational, charter and other types of boats and watercraft. More particularly, this invention relates to a utility station that can be used as a work, storage and/or entertainment station, and which can include a table or a combination of a table and either a tackle box or a console, which can be affixed with an adjustable mount to a wide variety of boats and watercraft.

Fisherman and other professional or recreational boaters often require quick and ready access to a wide variety of equipment, including fishing tools such as fishing rods, reels, lures, cutting knives, bait, etc. and other items such as first aid materials or refreshments. Usually, due to the rather limited deck space available on many boats, the use of on-board installations for storing or displaying such materials necessarily results in a sacrifice of available workspace or room for comfort, maneuverability and safety. Further, installation of permanent or semi-permanent storage cabinets, utility tables or stations restricts the ability to adapt boats to the myriad of activities often pursued by recreational boaters, i.e., by limiting available space for passengers, deck furniture, ski mounts, etc. It is desirable to provide a utility station that provides a working surface as well as storage facilities, yet does not reduce the available deck space on a boat.

While there are some prior art attempts to provide for utility tables or tackle boxes to be mounted on a fishing boat, none have completely satisfied the above noted concerns. For example, U.S. Pat. No. 3,575,481 (Phlieger, Jr.) shows a cabinet for storage of fishing items and having a work surface. U.S. Pat. No. 4,062,299 (Smith) shows a bait cutting table that is mounted on a central leg into the deck of a boat. U.S. Pat. No. 4,989,535 (Lacasse et al.) discloses a combination steering console and refreshment center for a pontoon boat. U.S. Pat. No. 5,048,447 (Vicari) provides a tournament style tackle box affixed to the deck of a fishing boat under a seat, worktable or fishing platform. Each of the tables or tackle boxes for boats shown in these prior art patents are mounted either as stand-alone units or as part of another console, and each of these devices takes up too much valuable space on the vehicle.

In addition, once the fishermen or boaters have used their equipment, the equipment must be packed into a portable tackle box for storage and carried away. It is desirable for a fisherman or boater, once he is done fishing, not to have to pack the fishing equipment into a separate tackle box but rather to have a utility station that can simply be carried away by the fisherman with the fishing equipment contained safely within in an organized fashion. Conversely, it is desirable for a fisherman or boater to have a combination of a tackle box and utility station that can be packed with fishing equipment prior to boarding the boat and immediately used on the boat as a station without the fisherman having to unpack the equipment from the tackle box and organize it in a utility station.

The invention disclosed herein addresses these concerns by providing for an integrated multifunctional utility station that is easily mounted to a wide variety of boats, is fully adjustable in height and depth relative to the boat deck in order to serve the needs of the user and to maximize the deck space available on the boat, and is easily removable and portable by the user.

SUMMARY OF THE INVENTION

Accordingly, it is one object of the present invention to provide an apparatus for storage, organization, easy access to and safe utilization of a variety of items for use on boats, such as rods, reels, tackle, bait, utensils and other fishing apparatus, first aid materials, as well as food, drinks, refreshments and other miscellaneous related equipment.

It is another object of this invention to provide for such apparatus that is configured for quick installation and removal from a wide variety of boats.

It is a further object of the invention to provide for such apparatus that is configured to accommodate standing access to the user.

It is yet another object of the invention to provide for such apparatus that is configured to operate as an attractive aerodynamic and ergonomic addendum to boats of various sizes and shapes.

It is yet a further object of the invention to provide for such apparatus that is configured to utilize otherwise-wasted space above the transom or back of a boat.

It is still another object of the invention to provide for such apparatus that is configured to operate as a fishing rod storage platform by providing for fishing rod storage receptacles in the body of the apparatus.

It is still a further object of the invention to provide for such apparatus that is configured to be used on the boat to provide storage, easy access and organization of equipment, yet be removable and useable as a portable and lightweight tackle box.

The present invention accomplishes all of the above objects by providing a multifunctional utility station that is suitable for use as a utility table, tackle box and/or storage chest, and which is mounted to a boat by a supporting system that is mounted to a side of the boat, either inside or outside. In a preferred embodiment, the station is optimally comprised of a flat work surface or cutting table; a shallow tray disposed at the front end of said work surface or cutting table, with an opening formed therein to function as a carrying handle for transporting the station when not in use, or as a towel holder or the like when the station is in use; a ruler affixed to or embossed across the length of the tray for measuring fish, bait or other items; a number of storage compartments with removable storage trays disposed therein for the storage of tackle, bait, hooks, first aid equipment, food items or the like; an arrangement of cup or bottle holders for placing glasses, cups or bottles; and receptacles for the temporary storage of fishing rods and reels that are in use. Alternatively, the station may be a table or console that may be used as a bar food service table or other type of table.

In the preferred embodiment, the utility station is affixed to and supported on the side of the boat by a mounting system, which includes at least one support member having a horizontal upper end and a vertical lower end. The utility station is mounted to the upper, horizontal end of each support member, which is slidably and adjustably attached to the underside of the utility station, preferably by being positioned within a receiving channel and receiving sleeve formed at the bottom of the station. Position setting means allow the utility station to be set at a desired depth with regard to the side of the boat. Position setting means can be in the form of adjustment channel grooves formed along the length of the interior walls of the receiving channels and an adjustment bolt that is slidably disposed therein. Position stops are formed along the bottom of the adjustment channels to allow the adjustment bolt to be set at a desired position. Alternatively, a toggle bolt may be used to set the horizontal end of the support member within the receiving sleeve. The vertical end of each support member is slidably and adjustably mounted to the side of the boat, and is preferably positioned within a channel bracket that is affixed to the boat's hull, either inside or outside the boat. The vertical portion of each support member may be further shaped in order to increase the clearance of the vertical end of the angled support member from the side of the boat in order to accommodate a bumper or similar lip around the edge of the hull. The utility station may be mounted so that it is supported either entirely within or outside the boat or partially inside and outside the boat.

The station may be fabricated from any suitable material that is water resistant, lightweight and durable, such as metal, plastic or even coated or treated wood. It is preferable that the station be molded or formed of a highly durable plastic or plastic polymer for ease of cleaning and durability. The support member, which can be in the form of tubing or preferably a flat bar, may be comprised of any suitable material that will adequately support the weight of the utility station, such as stainless steel, anodized aluminum, high density plastic or plastic polymer.

BRIEF DESCRIPTION OF THE DRAWINGS

The above and other objects and advantages of the invention will be apparent upon consideration of the following detailed description, taken in conjunction with the accompanying drawings, in which the reference characters refers to like parts throughout and in which.

DETAILED DESCRIPTION OF THE INVENTION

Figure 1:
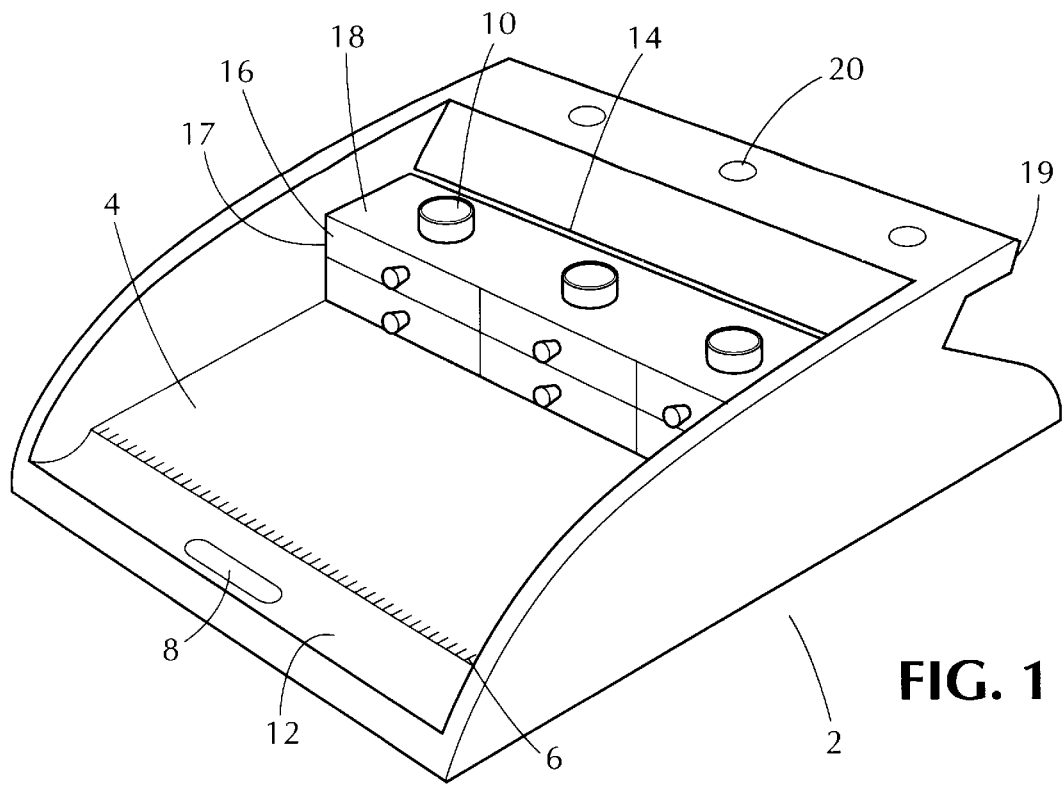
FIG. 1 is a front perspective view of the multipurpose utility station.

Referring now to the drawings in detail, FIG. 1 illustrates a multipurpose utility station 2 that is adapted to enable a user to perform a variety of tasks thereon and to store a variety of items therein. Although station 2 can have any of a variety of shapes that would accomplish the same purpose and structure, in the preferred embodiment shown in FIG. 1, station 2 has an aerodynamic and ergonomic profile, with the sides of station 2 bounded by flat walls whose top surfaces curve smoothly upward from the front end to the back end of station 2 such that the back end of station 2 is elevated as compared to the front end. An aerodynamic rearward-facing extension or lip 19 extends from the back of station 2 and thereby acts as a foil or spoiler when station 2 is mounted at the stern of the boat.

In a preferred embodiment, utility station 2 has a wide, flat work surface or cutting table 4, at the front edge of which is an embossed ruler 6, a quick access shallow tray 12 for storing small, frequently used items, and a widened aperture 8, which can function as a towel holder when station 2 is in use or as a carrying handle when station 2 is being used as a portable tackle box. Receptacles 20 for the temporary storage of fishing rods are set into the back area of station 2. Storage compartments 17 are situated towards the rear of work surface 4 on utility station 2. Storage trays 16 fit within storage compartments 17, and cup or bottle holders 10 are situated on the top surface of the storage compartment unit 18. Cup or bottle holders 10 may be formed as recessed within the top surface of storage compartment unit 18 or as having a raised rim projecting from the top surface of storage compartment unit 18. Preferably, a slot or channel 14 for the storage of knives, pliers or other instruments is located between the back of storage compartment unit 18 and aerodynamic lip 19.

The station 2 may be fabricated from any suitable material, most preferably one that is water resistant, lightweight and durable, such as treated wood, metal or, more preferably, plastic. For ease of cleaning and durability, it is most preferable that the station 2 be formed of a highly durable plastic or plastic polymer.

In the preferred embodiment of the invention, utility station 2 is an integrally-formed unit that has been molded as one piece. Thus, work surface 4, ruler 6, towel holder or carrying handle 8, cup or bottle holders 10, access tray 12, fishing rod receptacles 20 and, if possible, storage slot 14 and storage compartments 17, are all integrally formed components of station 2, comprised of any suitable high density plastic or plastic polymer and formed by any number of methods currently known in the art, such as blow molding, spin molding or, most preferably, rotation molding. Storage trays 16 that fit into storage compartments 17 may also be made of the same molded material as is made the main body of station 2. The integrality of the parts of station 2 is limited by the desired manufacturing capability and costs. If it is not desirable or possible to form storage compartment unit 18 integrally with the main body of station 2 and at the same time also form storage slot 14, depending on the cost or complexity of such manufacture, storage compartment unit 18 can be formed separately, preferably of the same molded material as the main body station 2. When storage compartment unit 18 is formed separately, it can be attached to the main body of station 2 by any of known attachment means, such as a snap fit.

Figure 3:
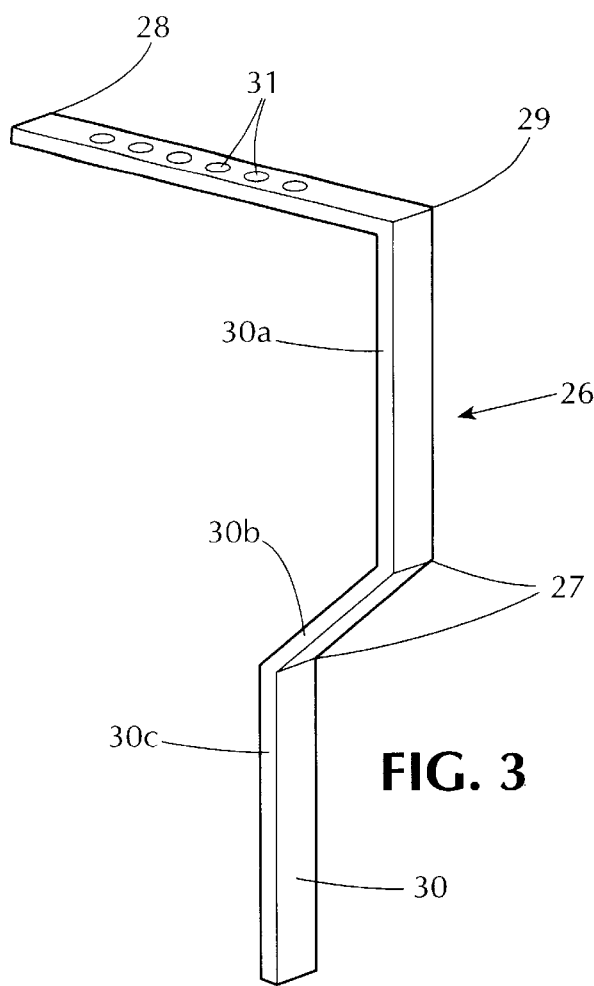
FIG. 3 is a side perspective view of a preferred embodiment of the support member.
Figure 9:
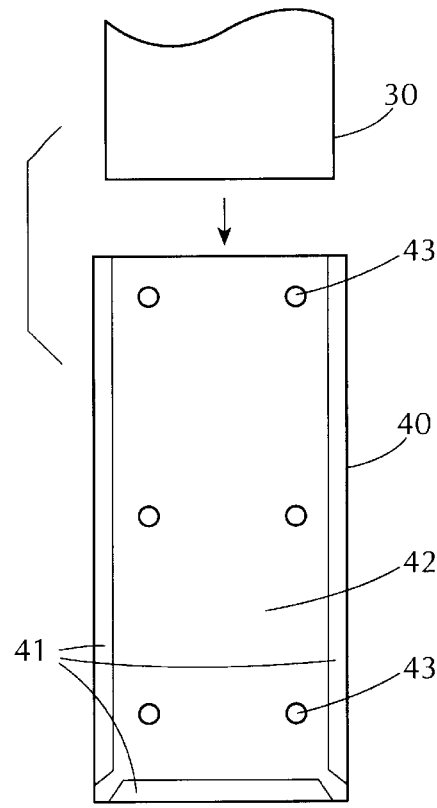
FIG. 9 is a front view of a channel bracket used to fix the vertical end of the support member.
Figure 7:
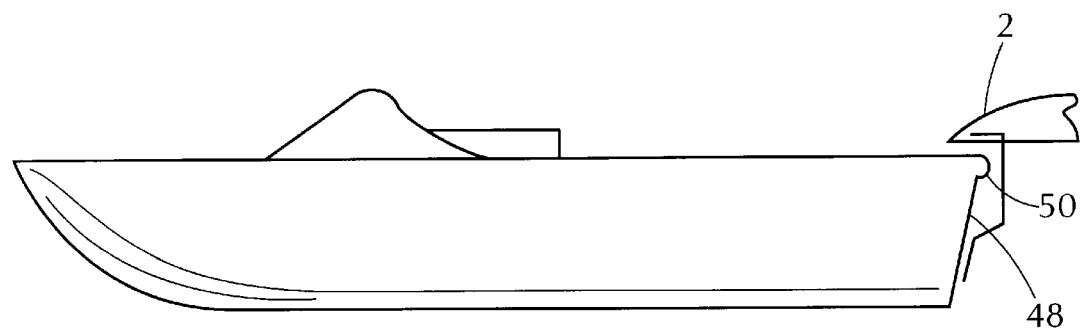
FIG. 7 is a side view of yet a third alternate horizontal adjustment of the multipurpose utility station as supported by the support member.
Figure 8:
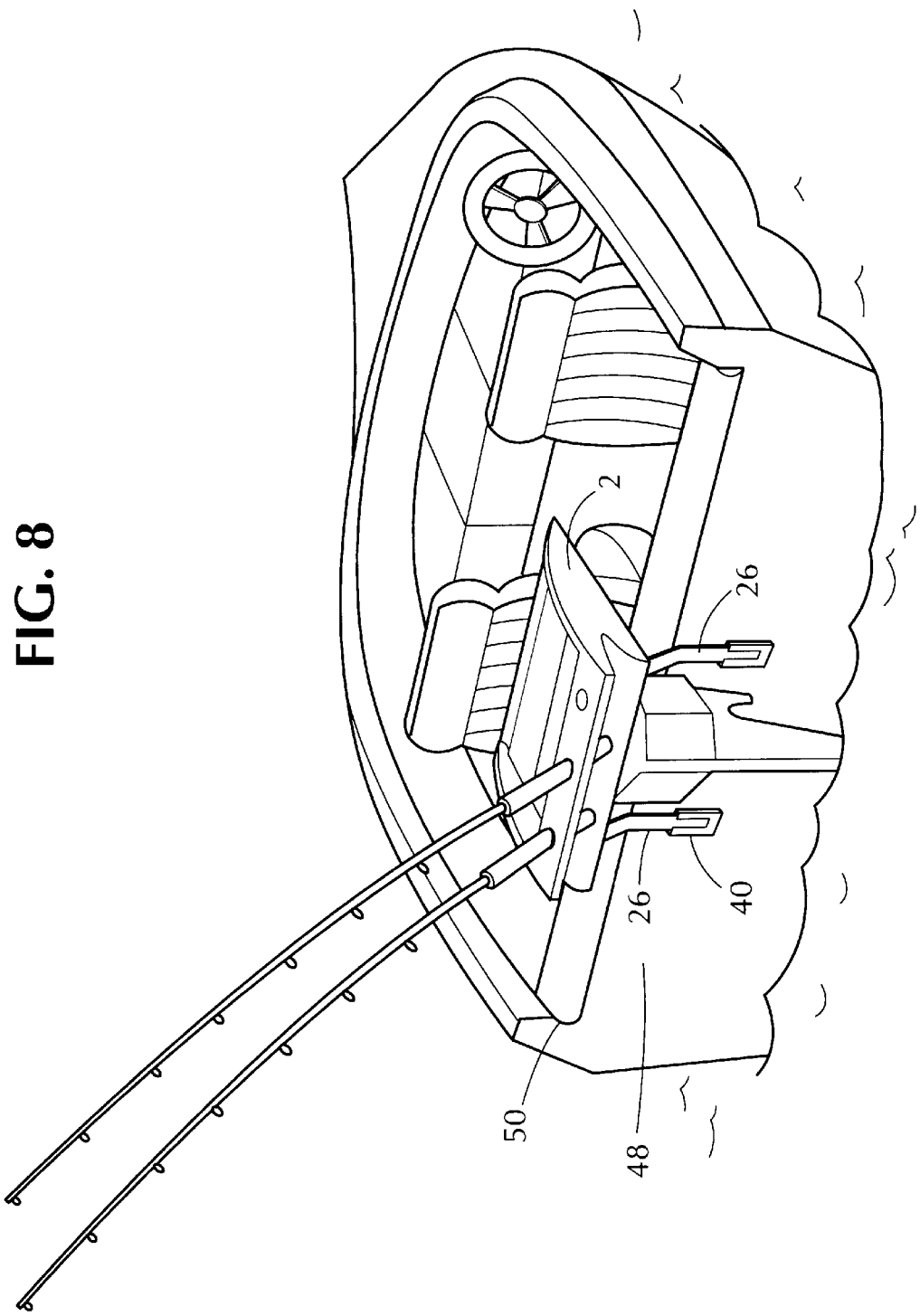
FIG. 8 is a rear perspective view illustrating the multipurpose utility station and support assembly affixed to a fishing or general recreational boat.

Station 2 is mounted and secured to the boat by means of one or more support members 26, a preferred embodiment of which is shown in FIG. 3. Each support member 26 has a first, upper end 28 that extends in a substantially horizontal direction and a second, lower end 30 that extends in a substantially vertical direction, such that first end 28 and second end 30 meet at angle 29. In one embodiment, horizontal first end 28 and vertical second end 30 are each straight and are configured at a substantially right angle 29 to each other, such that horizontal end 28 is affixed to and supports station 2 and vertical end 30 is attached to the boat's hull, either to the outside or inside thereof. It should be noted, however, as shown generally in FIGS. 5–7, that many boats have a bumper or rim 50 that projects outward from the upper edge of the hull 48 of the boat. Thus, when vertical end 30 of support member 26 is mounted to the outside hull 48 of a boat, a spacer or a bushing can be placed between the hull mounting means (channel bracket 40, as shown in FIGS. 8 and 9 and as discussed below) and vertical end 30 of support member 26 in order to set support member 26 away from the hull 48 and provide the clearance for the bumper or rim 50.

In a more preferred embodiment, however, as illustrated in FIGS. 3 and 5–7, vertical end 30 of support member 26 is bent or configured in such a way as to position the upper portion of vertical end 30 of support member 26 in a spaced relationship away from the hull or transom 48 of the boat and away from the bumper or rim 50. Accordingly, in this embodiment, vertical end 30 is slightly bent at two nearby locations 27, each at a complementary angle, once outward and once inward, thereby forming an upper portion 30a, a central portion 30b and a lower portion 30c of vertical end 30. Central portion 30b is angled with respect to both upper portion 30a and lower portion 30c such that, when lower portion 30c is mounted to the outside of the boat, upper portion 30a is spaced from the outside of the boat, in order to increase the clearance of upper portion 30a of vertical end 30 of angled support member 26 from the side of the boat. Preferably, angles 27 should be approximately 45°, in order to most esthetically and structurally accommodate a lip or bumper 50 around the edge of the hull 48. However, angle 29 joining horizontal end 28 and upper portion 30a of vertical end 30 is still a substantially right angle.

Support member 26 may be comprised of any suitable material that is strong and stiff so long as it will that will adequately support the weight of station 2, such as stainless steel, anodized aluminum, high density plastic or plastic polymer. Support member 26 could be tubular in shape but should preferably be flat and elongated, as shown in FIG. 3.

Station 2 is adjustably mounted to horizontal end 28 of support member 26. In a preferred embodiment of the invention, shown in FIG. 2, the bottom surface of station 2 is formed with at least one, and preferably two, receiving channels 22 that end in receiving sleeves 24, each of which is configured to receive the horizontal end 28 of angled support member 26. Receiving channels 22 and adjoining receiving sleeves 24 are disposed along the length of the bottom of station 2, and are sufficient in depth and width to accommodate horizontal ends 28 of angled support members 26 and provide a base for support of station 2. Although receiving sleeves 24 are preferably formed integrally with station 2, they can also be formed separately and attached by any known means. Receiving channels 22 have three walls, with the bottom of receiving channels 22 open to the air, and receiving sleeves 24 have four walls and are not open at the bottom. In the preferred embodiment, horizontal ends 28 of support members 26 are placed into the open ends of receiving channels 22, which serve as guides for the insertion of horizontal ends 28 of support members 26 into the adjoining receiving sleeves 24. Once ends 28 are inserted into and are firmly held by receiving sleeves 24, station 2 that is supported thereby does not pitch or roll over ends 28 of support members 26.

While utility station 2 is preferably mounted upon and supported by two support members 26 within receiving channels 22 and sleeves 24, station 2 could alternatively be supported by a single support member 26 inserted into a single receiving channel 22 and sleeve 24, as long as receiving channel 22 and sleeve 24 are centrally positioned on the underside of station 2 and the horizontal end 28 of single support member 26 (and receiving channel 22 and sleeve 24 adapted to receive horizontal end 28) is of sufficient width to prevent rotation or movement of station 2 about the horizontal end 28 of the support member 26 and of sufficient strength to support the weight of station 2. Thus, the use of a wide bar format of angled support member 26, as shown in FIG. 3, as well as the preferred anodized aluminum material, should most preferably used.

Although the preferred embodiment of the invention contemplates use of the integrally formed receiving channels 22 and sleeves 24 to fix horizontal ends 28 of support members 26, alternatively, horizontal ends 28 of support members 26 can be fixed to the bottom of station 2 by some other means, such as by the use of externally secured channel brackets, bolts, clamps, or screws and the like. When this is done, care must be taken to ensure that station 2 does not rotate about horizontal end 28 of support member 26. In a preferred embodiment, however, a flat bar, such as one formed of anodized aluminum, is used so that rotation of station 2 relative to horizontal end 28 of support member 26 is less likely.

Figure 4:
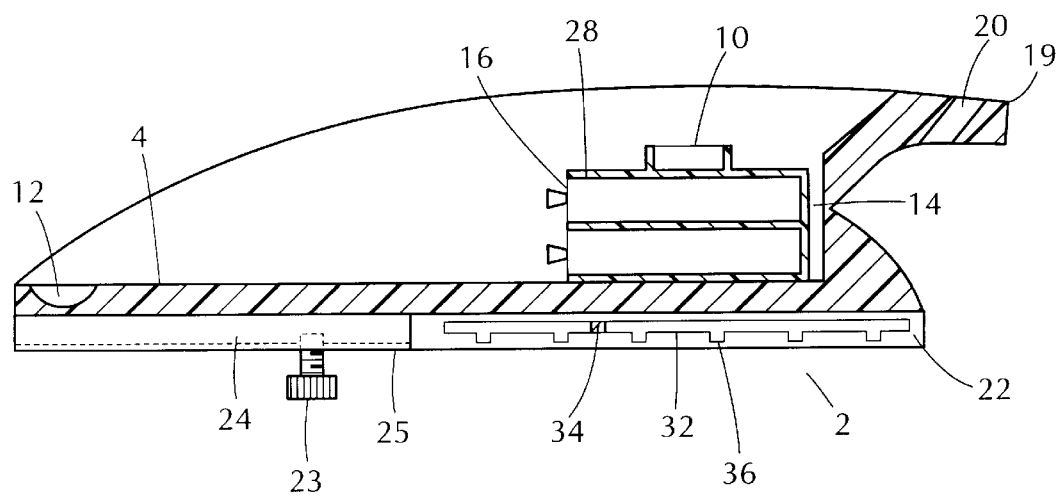
FIG. 4 is a side cross-sectional side view of a preferred embodiment of the multipurpose utility station showing the depth adjustment channel disposed within the receiving channels.

As illustrated in FIG. 4, station 2 also has a means of setting its position relative to horizontal end 28 of support member 26. In a preferred embodiment, the interior opposing walls of each receiving channel 22 have a molded adjustment channel 32 that are adapted to receive the ends of a depth adjustment bolt 34. Depth adjustment bolt 34 acts to prevent further insertion of horizontal end 28 of angled support member 26 into receiving channel 22 or sleeve 24 beyond a specific point by contacting angled support member 26 at the inside of right angle 29 at which horizontal end 28 and vertical end 30 of angled support member 26 meet. Each molded adjustment channel 32 has a number of U-shaped pockets or position stops 36 that act as secure position resting stops for adjustment bolt 34 in order to securely fix depth adjustment bolt 34 and prevent it from sliding along adjustment channel 32. When fixed within a stop 36, depth adjustment bolt 34 prevents movement of support member 26 further into receiving channel 22 or sleeve 24. Depth adjustment bolt 34 also further secures station 2 to horizontal end 28 of support member 26 by preventing station 2 from being lifted upward off horizontal end 28 of support member 26.

Figure 2:
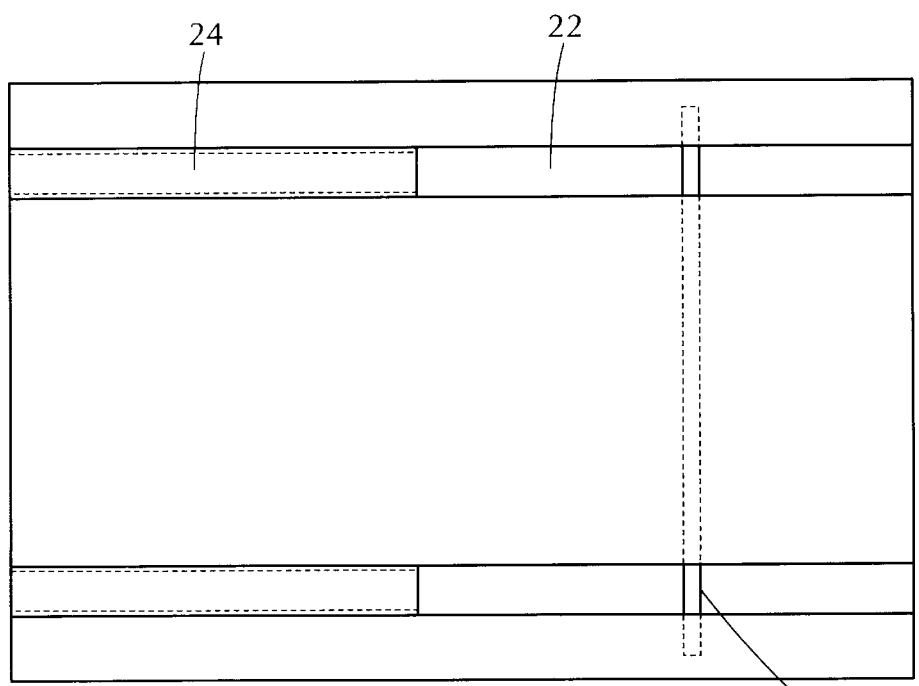
FIG. 2 is a bottom view of the multipurpose utility station.

Depth adjustment bolt 34 is illustrated in FIG. 2 as being one elongated bolt that extends across the width of station 2 and is thus able to set the positions of both support members 26 relative to station 2. Alternatively, adjustment bolt 34 could be more than one bolt, for example a separate bolt for each support member 26. As such, each support member 26 would be set relative to station 2 by a different bolt 34. Of course, when station 2 is supported by only one support member 26, as in an alternate embodiment, one adjustment bolt 34 would be used.

Movement of station 2 relative to horizontal end 28 of support member 26, whether one or more support members 26 are used to mount station 2 on the boat, can be accomplished also by way of a set screw or toggle bolt 23. Such a set screw or toggle bolt 23 can be positioned on the outside of sleeve 24 and projecting into the inside of sleeve 24 in order to set horizontal end 28 of support member 26 in its position within sleeve 24 and, correspondingly, station 2 at its position relative to support member 26. Once horizontal end 28 of support member 26 is inserted into sleeve 24 to the desired position, toggle bolt 23 is tightened through the bottom wall 25 of sleeve 24 and tightened frictionally against horizontal end 28 within sleeve 24 in order to stabilize horizontal end 28 in its position within sleeve 24 and station 2 in its position relative to support member 26. Alternatively, in another embodiment, horizontal end 28 of support member 26 could have holes 31 formed therethrough to receive toggle bolt 23. In this embodiment, toggle bolt 23 would be inserted through the bottom wall 25 of sleeve 24 and into sleeve 24, through the holes 31 formed in horizontal end 28 and against the inside top wall of sleeve 24. Once toggle bolt 23 is inserted through a specific hole 31 in horizontal end 28 of support member 26 and tightened against the inside top wall of sleeve 24, horizontal end 28 is set in its position within sleeve 24 and station 2 is set in its position relative to support member 26.

Thus, the depth of station 2 can be adjusted relative to the deck of the boat in several ways. The first way in which the depth of station 2 can be adjusted is, as discussed above, by placing station 2 onto horizontal ends 28 of support member 26 so that ends 28 fit within channels 22 and allowing ends 28 to extend into sleeves 24 until station 2 reaches the desired position relative to the boat deck. Then, depth adjustment bolt 34 is slid along the adjustment channels 32 into the desired stop position 36 to maintain station 2 in the desired position relative to horizontal end 28 of support member 26. Alternatively, toggle bolt 23 can be tightened through wall 25 against horizontal end 28 or through a hole 31 in horizontal end 28 to maintain station 2 in the desired position relative to horizontal end 28 of support member 26. If neither of these adjustments allows station 2 to be positioned far enough away from the deck, for example due to the length of horizontal end 28 of support member 26 which extends as far as possible into sleeves 24, the position of station 2 over the deck or the edge of the boat can be further adjusted by cutting or foreshortening horizontal ends 28 of support members 26 to the desired length and by fixing them deeper into sleeves 24. Of course, depth adjustment bolt 34 is then set within the desired stop position 36 of adjustment channels 32.

Figure 5:
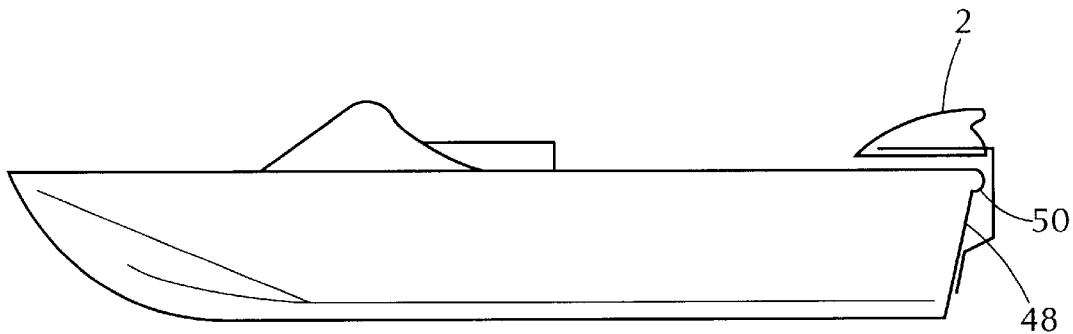
FIG. 5 is a side view of one horizontal and vertical adjustment of the multipurpose utility station as supported by the support member.
Figure 6:
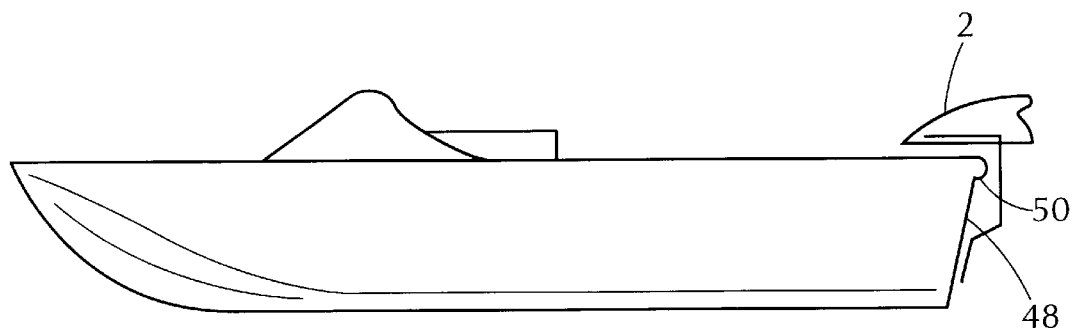
FIG. 6 is a side view of an alternate horizontal adjustment of the multipurpose utility station as supported by the support member.

For instance, should the user desire that station 2 occupy the least amount of deck space, horizontal ends 28 of support members 26 may be cut to a length nearly equal to that of receiving sleeves 24 and depth adjustment bolt 34 will be set at the stop position 36 along adjustment channels 32 closest to receiving sleeves 24. It will be obvious to the user of station 2 that a sufficient length of horizontal ends 28 of support members 26 must be inserted into receiving sleeves 24 in order to adequately support station 2 and prevent station 2 from being capable of being lifted upward away from horizontal ends 28 of the support members 26. FIG. 5 illustrates one adjustment of utility station 2 supported by horizontal end 28 of support member 26. FIGS. 6 and 7 show additional depth adjustments of station 2 in which horizontal ends 28 of support members 26 have been foreshortened to the length needed such that utility station 2 is set at the desired depth relative to the edge of the boat.

Figure 10:
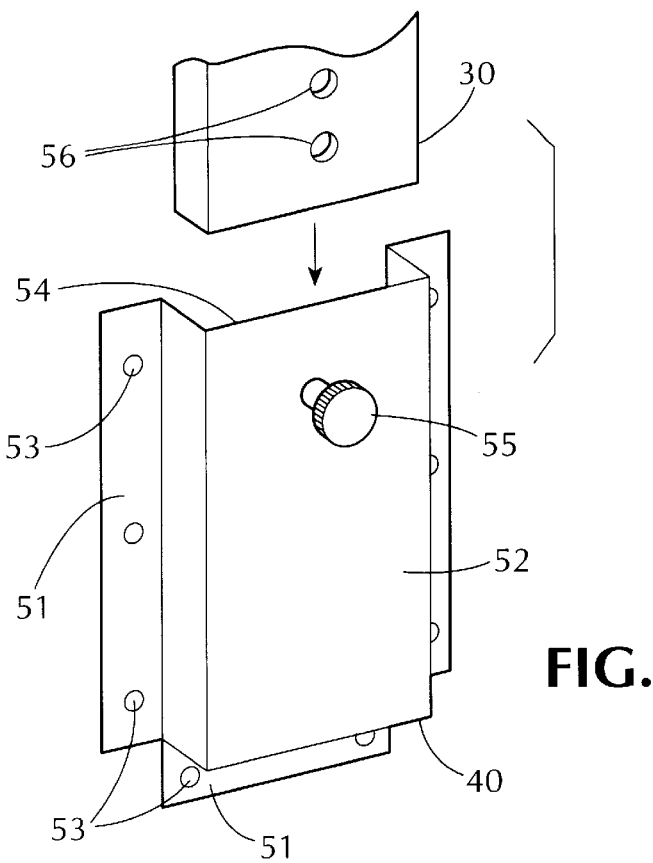
FIG. 10 is a front perspective view of an alternative channel bracket used to fix the vertical end of the support member.

Vertical end 30 of angled support member 26 is adjustably mounted to the hull of a boat, preferably to the outside of the boat, as shown in FIG. 8, by a channel bracket 40. As illustrated in FIG. 9, a first embodiment of channel bracket 40 has a flat back 42 whose side and bottom edges 41 are folded or curled inward to retain vertical end 30 of support member 26 between bracket edges 41 and bracket back 42. This first embodiment of channel bracket 40 can be fixed to the hull or transom of a boat by any suitable means, such as by watertight screws, watertight bolts, resins or adhesives. In order to accommodate screws, channel bracket back 42 can be equipped with screw holes 43. Alternatively, as illustrated in FIG. 10, a second embodiment of channel bracket 40 has a flat front 52 whose side and bottom edges 51 are folded or curled outward to create a cavity 54 to retain vertical end 30 of support member 26 between the inside of bracket front 52 and the side 48 of the boat. This second embodiment of channel bracket 40 can be fixed to the hull of a boat by any suitable means, such as by watertight screws, watertight bolts, resins or adhesives. In order to accommodate screws, side and bottom channel bracket edges 51 can be equipped with screw holes 53.

Figure 11:
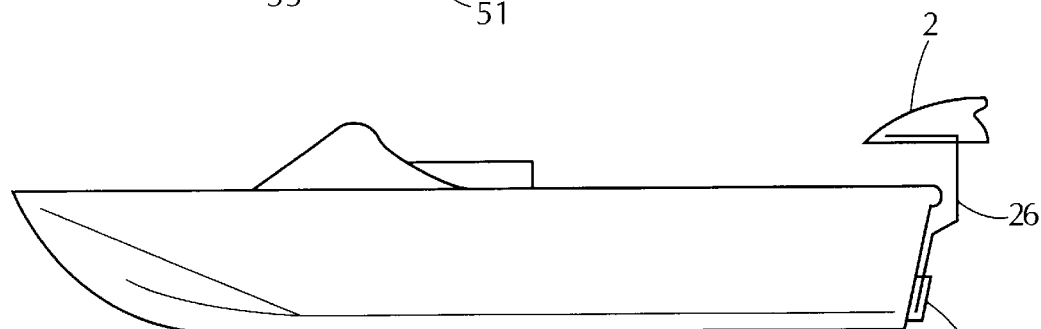
FIG. 11 is a side view of an alternate vertical adjustment of the multipurpose utility station as supported by the support member.
Figure 12:
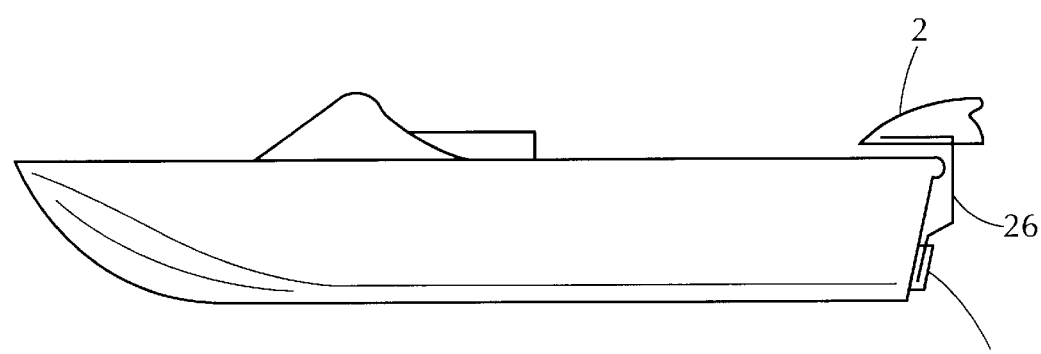
FIG. 12 is a side view of yet another vertical adjustment of the multipurpose utility station as supported by the support member.

The height of station 2 over the boat deck may be adjusted by fixing channel bracket 40 higher or lower on the hull of the boat and/or by cutting or foreshortening vertical ends 30 of support members 26 to the desired length so that station 2 is positioned at the desired height relative to the boat deck, as shown in FIGS. 11 and 12. Of course, channel bracket 40 may also be affixed to the inside of the boat to allow support member to attached to and adjusted at the inside of the boat rather than at the outside. The depth of utility station 2 can thus be adjusted either inside and/or outside the boat space.

Alternatively, the height of station 2 over the boat deck can be adjusted through use of a set screw or toggle bolt 55. When used with the second embodiment of channel bracket 40, as shown in FIG. 10, such a set screw or toggle bolt 55 can be positioned on the outside surface 52 of channel bracket 40 and into the interior cavity 54 of bracket 40, so as to set vertical end 30 of support member 26 in its position within channel bracket 40 and, correspondingly, station 2 at its height position relative to the boat deck. Once vertical end 30 of support member 26 is inserted into channel bracket 40 to the desired position, toggle bolt 55 is tightened through the front wall 52 of bracket 40 and tightened frictionally against vertical end 30 within bracket 40 (which forces vertical end 30 to be frictionally tightened against the side 48 of the boat) in order to stabilize vertical end 30 in its position within bracket 40 and station 2 in its height position relative to the boat deck. Alternatively, in another embodiment, vertical end 30 of support member 26 could have holes 56 formed therethrough to receive toggle bolt 55, as shown in FIG. 10. In this embodiment, toggle bolt 55 would be inserted through the front wall 52 of bracket 40 and into cavity 54, through the holes 56 formed in vertical end 30 and against the side 48 of the boat. Once toggle bolt 55 is inserted through a specific hole 56 in vertical end 30 of support member 26 and tightened against the side 48 of the boat, vertical end 30 is set in its position within bracket 40 and station 2 is set in its height position relative to the boat deck.

When used with the first embodiment of channel bracket 40, as shown in FIG. 9, such a set screw or toggle bolt can be positioned on the outside surface of, and through, vertical end 30 of support member 26 such that the end of the toggle bolt frictionally contacts back 42 of channel bracket 40 (not shown), so as to set vertical end 30 of support member 26 in its position within channel bracket 40 and, correspondingly, station 2 at its height position relative to the boat deck. Once vertical end 30 of support member 26 is inserted into channel bracket 40 to the desired position, the toggle bolt is tightened through vertical end 30 of support member 26 and tightened frictionally against back 42 of bracket 40, thereby forcing vertical end 30 to be frictionally tightened against the insides of edges 41 of bracket 40 in order to stabilize vertical end 30 in its position within bracket 40 and station 2 in its height position relative to the boat deck.

In order to install utility station 2 on a boat, the user need only affix one or more channel brackets 40 to the hull or transom of the boat, either on its inside or outside. Then, one or more support members 26 are mounted relative to the boat by inserting vertical ends 30 of support members 26 into channel brackets 40. Station 2 is then affixed to horizontal ends 28 of support members 26 by placing horizontal ends 28 into receiving channels 22 along the bottom of station 2 and pushing ends 28 further into receiving sleeves 24 to the desired depth. The height and depth of station 2 relative to the deck of the boat can be adjusted as discussed above.

It is clear that the mounting apparatus and the method of mounting station 2 described above can be used with a wide variety of boats having either inboard or outboard motors. As illustrated in FIG. 8, two support members 26 can be mounted to the hull of the boat at vertical ends 30 so as to accommodate the placement of an outboard motor between support members 26.

Station 2 can be used in a variety of ways once it has been mounted on support members 26. For example, it can be used as a portable bar for preparing refreshments such as food or drinks for boat passengers, as a tackle box and utility table for preparing bait and other items needed for fishing, as a first aid station during times of distress, or as a utility table or other activities.

Once utility station 2 has been installed and items have been placed within storage trays 16 and storage compartments 17, station 2 can be removed from support members 26 and carried as a portable tackle box or utility box for transporting and storing the items within storage trays 16 and storage compartments 17. This is accomplished by a user pulling station 2 forward so that horizontal ends 28 of support members 26 slide out of sleeves 24, and lifting station 2 offends 28 of support members 26. Then, station 2 is gripped at widened aperture 8 so that station 2 hangs by the side of the user for ease of transport, and, in this way, items that are within storage trays 16 or storage compartments 17 do not fall out during transport. Utility station 2 can thus be carried as a portable tackle box, refreshment kit, first aid kit, or other type of carrying box. In addition, a user can pack items into the portable utility station 2 prior to its installation, transport it to the boat, mount station 2 on support members 26, and utilize the items within station 2 without having to unpack these items and replace them into station 2 for use.

Thus, a combination of a utility station and portable utility box with an integrated adjustable mount is provided. One skilled in the art will appreciate that the present invention can be practiced by other than the described embodiments, which are provided for purposes of illustration and not limitation, and that the present invention is limited only by the claims that follow.

What is claimed is:

1. A utility station supported on a boat, comprising:
a housing shaped as an aerodynamic fin or airfoil and having at least a flat working surface; and
at least one support member for supporting said housing at a height relative to the deck of said boat and at a depth relative to the side or transom of said boat and to said support member, said at least one support member being adjustably mounted to the side or transom of said boat such that the height of said housing relative to said boat can be adjusted and being adjustably mounted to said housing such that the depth of said housing relative to the side or transom of said boat and to said support member can be adjusted.

2. The utility station of claim 1 wherein said housing further comprises a ruler embossed across said flat working surface.

3. The utility station of claim 1 wherein said housing further comprises at least one storage compartment adapted for receiving items for storage.

4. The utility station of claim 3 wherein said at least one storage compartment are integrally formed with said housing.

5. The utility station of claim 1 wherein said housing further comprises at least one cup or bottle receptacle formed into a top surface of said housing.

6. The utility station of claim 1 wherein said housing further comprises at least one fishing rod holder formed into a top surface of said housing.

7. The utility station of claim 1 wherein said at least one support member has one vertical end and one horizontal end, and said housing comprises a housing mounting apparatus at a bottom surface of said housing for adjustably mounting said housing to said horizontal end of said at least one support member.

8. The utility station of claim 7 wherein said housing mounting apparatus comprises at least one receiving sleeve at the bottom of said housing for receipt of said horizontal end of said at least one support member, whereby said housing is mounted on said at least one support member by inserting said horizontal end of said at least one support member into said at least one receiving sleeve.

9. The utility station of claim 8 wherein said support member has an elongated and flattened shape at least at said horizontal end, and said receiving sleeve is adapted to receive a flat member.

10. The utility station of claim 8 wherein said housing mounting apparatus further comprises at least one receiving channel having at least a bottom surface and two side surfaces, said at least one receiving channel being in coalignment with said at least one receiving sleeve for guiding said horizontal end of said at least one support member into said at least one receiving sleeve.

11. The utility station of claim 10 wherein said housing mounting apparatus further comprises a position stop member for adjustably setting the mounting position of said housing relative to said support member.

12. The utility station of claim 11 wherein said at least one receiving channel comprises at least one adjustment channel formed through said side surfaces, and said position stop member comprises at least one adjustment bolt for insertion through said at least one adjustment channel and across said at least one receiving channel, wherein said at least one adjustment bolt and said at least one adjustment channel cooperate to maintain the adjusted mounting position of said housing relative to said support member.

13. The utility station of claim 12 wherein said at least one adjustment channel further comprises at least two adjustment bolt position resting stops, such that when said adjustment bolt rests in one of said adjustment bolt position resting stops said housing is securely set relative to said support member.

14. The utility station of claim 11 wherein said at least one receiving sleeve comprises an aperture disposed through the outer wall of said at least one receiving sleeve, and said position stop member comprises at least one adjustment bolt mounted through said receiving sleeve outer wall aperture, wherein said at least one adjustment bolt and said support member horizontal end cooperate to maintain the adjusted mounting position of said housing relative to said support member.

15. The utility station of claim 14 wherein said support member horizontal end comprises at least one aperture disposed therethrough, and said at least one adjustment bolt cooperates with said at least one aperture to allow the adjusted mounting position of said housing relative to said support member to be set and maintained.

16. The utility station of claim 14 wherein said at least one adjustment bolt frictionally cooperates with said support member horizontal end to allow the adjusted mounting position of said housing relative to said support member to be set and maintained.

17. The utility station of claim 8 wherein said horizontal end of said at least one support member is adapted to be foreshortened in order to adjustably set the mounting position of said housing relative to said support member and the depth of said housing relative to the side or transom of said boat.

18. The utility station of claim 1 wherein said at least one support member has one vertical end and one horizontal end, and said utility station further comprises support member mounting apparatus at the side or transom of said boat for cooperating with said vertical end of said at least one support member for adjustably mounting said vertical end of said at least one support member to said boat.

19. The utility station of claim 18 wherein said support member mounting apparatus comprises at least one bracket affixed to the side or transom of said boat for receipt of said vertical end of said at least one support member, whereby said at least one support member is mounted in said at least one bracket by inserting said vertical end of said at least one support member into said at least one bracket.

20. The utility station of claim 19 wherein said support member has an elongated and flattened shape at least at said vertical end, and said at least one bracket is adapted to receive a flat member.

21. The utility station of claim 19 wherein said at least one bracket is affixed to the outside of said boat, whereby the mounting position of said vertical end of said at least one support member relative to the outside of said boat can be adjusted such that the height of said housing relative to said boat can be adjusted.

22. The utility station of claim 21 wherein said at least one bracket comprises an aperture disposed through an outer wall thereof, and said support member mounting apparatus further comprises at least one position stop member mounted through said aperture in said outer wall of said at least one bracket, wherein said at least one position stop member and said vertical end of said at least one support member cooperate to maintain the adjusted mounting position of said support member relative to the side or transom of said boat.

23. The utility station of claim 22 wherein said support member vertical end comprises at least one aperture disposed therethrough, and said at least one position stop member comprises at least one adjustment bolt which cooperates with said at least one aperture to allow the adjusted mounting position of said vertical end of said at least one support member relative to said at least one bracket to be set and maintained.

24. The utility station of claim 22 wherein said position stop member comprises at least one adjustment bolt which frictionally cooperates with said vertical end of said at least one support member to allow the adjusted mounting position of said vertical end of said at least one support member relative to said at least one bracket to be set and maintained.

25. The utility station of claim 16 wherein said vertical end of said at least one support member is adapted to be foreshortened in order to adjustably set the mounting position of said or transom at least one support member relative to the side of said boat and the height of said housing relative to said boat.

26. The utility station of claim 1 wherein said at least one support member comprises at least one elongated support member having one vertical end and one horizontal end that are oriented relative to each other at a substantially right angle.

27. The utility station of claim 26 wherein said vertical end of said at least one support member has an upper portion, a central portion and a lower portion such that said lower portion is mounted to the side or transom of said boat, wherein said central portion is angled with respect to both said upper portion and said lower portion such that when said lower portion is mounted to the side or transom of said boat said upper portion is spaced from the side or transom of said boat.

28. An apparatus for mounting a utility station to a boat relative to the deck and side or transom of said boat, comprising:
    least one elongated support member having a first end and a second end disposed at substantially a right angle to each other;
    at least one mounting sleeve integrally formed with said utility station and disposed at an underside of said utility station, said sleeve being capable of receiving said first end of at least one said support member; and
    at least one mounting bracket capable of being affixed to the side or transom of said boat and capable of receiving said second end of said at least one support member.

29. The apparatus of claim 28 wherein said at least one support member has a wide and flat cross-sectional shape.

30. The apparatus of claim 28 wherein each said mounting sleeve comprises a mounting channel having side surfaces in coalignment with said mounting sleeve for guiding said first end of said at least one support member into said mounting sleeve.

31. The apparatus of claim 30 wherein each said mounting channel further comprises a position stop member for adjustably setting the mounting position of said utility station relative to said support member for adjustably setting the depth of said utility station relative to the side or transom of said boat.

32. The apparatus of claim 31 wherein each said mounting channel further comprises at least one adjustment channel formed through said side surfaces, and said position stop member comprises an adjustment bolt for insertion through said at least one adjustment channel and across said mounting channel, wherein said adjustment bolt and said at least one adjustment channel cooperate to maintain the mounting position of said utility station relative to said support member.

33. The apparatus of claim 32 wherein said at least one adjustment channel further comprises at least two adjustment bolt position resting stops, such that when said adjustment bolt rests in one of said adjustment bolt position resting stops said utility station is securely set relative to said support member.

34. The apparatus of claim 28 wherein each said at least one mounting sleeve comprises an outer wall and an aperture disposed therethrough, said apparatus further comprising at least one adjustment bolt for insertion through said outer wall aperture and against said first end of said support member, wherein said at least one adjustment bolt, said mounting sleeve outer wall aperture and said support member first end cooperate to maintain the mounting position of said utility station relative to said support member.

35. The apparatus of claim 34 wherein said first end of said support member comprises at least one aperture disposed therethrough, and said at least one adjustment bolt cooperates with said at least one aperture to allow the adjusted mounting position of said utility station relative to said support member to be set and maintained.

36. The apparatus of claim 34 wherein said at least one adjustment bolt frictionally cooperates with said first end of said support member to allow the adjusted mounting position of said utility station relative to said support member to be set and maintained.

37. The apparatus of claim 28 wherein said first end of said at least one support member is adapted to be foreshortened in order to adjustably set the mounting position of said utility station relative to said support member and the depth of said utility station relative to the side or transom of said boat.

38. The apparatus of claim 28 wherein said at least one support member is mounted vertically in said at least one mounting bracket by inserting said second end of said at least one support member into said at least one mounting bracket.

39. The apparatus of claim 38 wherein said support member has a flattened shape at least at said second end, and said mounting bracket is adapted to receive a flat member.

40. The apparatus of claim 28 wherein said mounting bracket is affixed to the side or transom of said boat for adjustably setting the mounting position of said at least one support member relative to the side or transom of said boat for adjustably setting the height of said station relative to the deck of said boat.

41. The apparatus of claim 40 wherein said mounting bracket comprises an aperture disposed through an outer wall thereof, and said apparatus further comprises a position stop member mounted through said aperture in said outer wall of said mounting bracket, wherein said position stop member and said second end of said at least one support member cooperate to maintain the adjusted mounting position of said support member relative to the side or transom of said boat.

42. The apparatus of claim 41 wherein said second end of said support member comprises at least one aperture disposed therethrough, and said position stop member comprises an adjustment bolt which cooperates with said at least one aperture to allow the adjusted mounting position of said second end of said support member relative to said mounting bracket to be set and maintained.

43. The apparatus of claim 41 wherein said position stop member comprises an adjustment bolt which frictionally cooperates with said second end of said support member to allow the adjusted mounting position of said second end of said at least one support member relative to said at least one mounting bracket to be set and maintained.

44. The apparatus of claim 40 wherein said second end of said at least one support member is adapted to be foreshortened in order to adjustably set the mounting position of said at least one support member relative to the side or transom of said boat and the height of said utility station relative to the deck of said boat.

45. The utility station of claim 4 further comprising a storage slot behind said at least one integrally formed storage compartment.

46. A utility station supported on a boat, comprising:
 a housing having at least a flat working surface; and
 at least one support member for supporting said housing at a height relative to the deck of said boat and at a depth relative to the side or transom of said boat and to said support member, said at least one support member being adjustably mounted to the side or transom of said boat such that the height of said housing relative to said boat can be adjusted and being adjustably mounted to said housing such that the depth of said housing relative to the side or transom of said boat and to said support member can be adjusted;
 wherein said housing is removably mounted to said at least one support member and said housing comprises an aperture near the front of said housing for use as a handle, such that said housing can be removed from said support member and carried by said handle.

47. A utility station supported on a boat, comprising:
 a housing having a flat working surface and a housing mounting apparatus at a bottom surface of said housing; and
 at least one support member having one vertical end adjustably mounted to the side or transom of said boat for supporting said housing at an adjustable height relative to the deck of said boat and having one horizontal end being adjustably mounted to said housing mounting apparatus for supporting said housing at an adjustable depth relative to the side or transom of said boat and to said support member;
 said housing mounting apparatus comprising:
  at least one receiving sleeve at a bottom surface thereof for adjustable receipt of said horizontal end of said at least one support member, whereby said housing is mounted on said horizontal end of said at least one support member by inserting said horizontal end of said at least one support member into said at least one receiving sleeve;
  at least one receiving channel having at least a top surface and two side surfaces each comprising at least one adjustment channel formed therethrough, said at least one receiving channel being in coalignment with said at least one receiving sleeve for guiding said horizontal end of said at least one support member into said at least one receiving sleeve; and
  a position stop member for adjustably setting the mounting position of said housing relative to said support member comprising at least one adjustment bolt for insertion through said at least one adjustment channel and across said at least one receiving channel, wherein said at least one adjustment bolt and said at least one adjustment channel cooperate to maintain the adjusted mounting position of said housing relative to said support member;
  said at least one adjustment channel further comprising at least two adjustment bolt position resting stops, such that when said adjustment bolt rests in one of said adjustment bolt position resting stops said housing is securely set relative to said support member.

48. A utility station supported on a boat, comprising:
 a housing having a flat working surface and a housing mounting apparatus at a bottom surface of said housing; and
 at least one support member having one vertical end adjustably mounted to the side or transom of said boat for supporting said housing at an adjustable height relative to the deck of said boat and having one horizontal end being adjustably mounted to said housing mounting apparatus for supporting said housing at an adjustable depth relative to the side or transom of said boat and to said support member;
 said housing mounting apparatus comprising:
  at least one receiving sleeve at a bottom surface thereof for adjustable receipt of said horizontal end of said at least one support member, whereby said housing is mounted on said horizontal end of said at least one support member by inserting said horizontal end of said at least one support member into said at least one receiving sleeve;
  at least one receiving channel having at least a top surface and two side surfaces each comprising at least one adjustment channel formed therethrough, said at least one receiving channel being in coalignment with said at least one receiving sleeve for guiding said horizontal end of said at least one support member into said at least one receiving sleeve;
  a position stop member for adjustably setting the mounting position of said housing relative to said support member comprising an aperture disposed through the outer wall of said at least one receiving sleeve and at least one adjustment bolt mounted through said receiving sleeve outer wall aperture, wherein said at least one adjustment bolt and said support member horizontal end cooperate to maintain the adjusted mounting position of said housing relative to said support member; and at least one aperture disposed through said support member horizontal end, said at least one adjustment bolt cooperating with said at least one aperture to allow the adjusted mounting position of said housing relative to said support member to be set and maintained.

49. A utility station supported on a boat, comprising:

a housing having a flat working surface;

a support member mounting apparatus at the side or transom of said boat; and at least one support member having one vertical end adjustably mounted to said support member mounting apparatus for supporting said housing at an adjustable height relative to the deck of said boat and having one horizontal end being adjustably mounted for supporting said housing at an adjustable depth relative to the side or transom of said boat;

said support member mounting apparatus comprising at least one bracket affixed to outside of said boat for receipt of said vertical end of said at least one support member, whereby said at least one support member can be adjustably mounted in said at least one bracket by inserting said vertical end of said at least one support member into said at least one bracket such that the height of said housing relative to said boat can be adjusted.

50. The utility station of claim 49 wherein said at least one bracket comprises an aperture disposed through an outer wall thereof, and said support member mounting apparatus further comprises at least one position stop member mounted through said aperture in said outer wall of said at least one bracket, wherein said at least one position stop member and said vertical end of said at least one support member cooperate to maintain the adjusted mounting position of said support member relative to the side or transom of said boat.

51. The utility station of claim 50 wherein said support member vertical end comprises at least one aperture disposed therethrough, and said at least one position stop member comprises at least one adjustment bolt which cooperates with said at least one aperture to allow the adjusted mounting position of said vertical end of said at least one support member relative to said at least one bracket to be set and maintained.

52. The utility station of claim 50 wherein said position stop member comprises at least one adjustment bolt which frictionally cooperates with said vertical end of said at least one support member to allow the adjusted mounting position of said vertical end of said at least one support member relative to said at least one bracket to be set and maintained.

53. A utility station supported on a boat, comprising:

a housing having at least a flat working surface; and at least one support member for supporting said housing at a height relative to the deck of said boat and at a depth relative to the side of said boat and to said support member, said at least one support member having one vertical end and one horizontal end that are oriented relative to each other at a substantially right angle;

wherein said horizontal end is adjustably mounted to said housing such that the depth of said housing relative to the side or transom of said boat and to said support member can be adjusted wherein said vertical end has an upper portion, a central portion and a lower portion, said central portion being angled with respect to both said upper portion and said lower portion, whereby, when said lower portion is adjustably mounted to the side or transom of said boat such that the height of said housing relative to said boat can be adjusted, said upper portion is spaced from the side or transom of said boat.

54. An apparatus for mounting a utility station to a boat relative to the deck and side or transom of said boat, comprising:

at least one elongated support member each having a first end and a second end disposed at substantially a right angle to each other, said first end having at least one aperture disposed therethrough;

at least one mounting sleeve disposed at an underside of said utility station capable of receiving said first end of at least one said support member and comprising an outer wall having an aperture disposed therethrough;

at least one mounting bracket capable of being affixed to the side or transom of said boat and capable of receiving said second end of said at least one support member; and at least one adjustment bolt;

wherein, when said at least one adjustment bolt is inserted through said outer wall aperture and through an aperture in said first end of said support member, said at least one adjustment bolt, said mounting sleeve outer wall aperture and said aperture in said support member first end cooperate to allow the adjusted mounting position of said utility station relative to said support member to be set and maintained.

55. An apparatus for mounting a utility station to a boat relative to the deck and side or transom of said boat, comprising:

at least one elongated support member each having a first end and a second end disposed at substantially a right angle to each other, said second end having at least one aperture disposed therethrough;

at least one mounting sleeve disposed at an underside of said utility station capable of receiving said first end of at least one said support member;

at least one mounting bracket capable of being affixed to the side or transom of said boat and capable of receiving said second end of said at least one support member for adjustably setting the mounting position of said at least one support member relative to the side or transom of said boat for adjustably setting the height of said station relative to the deck of said boat, and comprising an aperture disposed through an outer wall thereof; and an adjustment bolt mounted through said aperture in said outer wall of said mounting bracket, wherein said adjustment bolt cooperates with said at least one aperture in said second end of said at least one support member to allow the adjusted mounting position of said support member relative to said mounting bracket and said side or transom of boat to be set and maintained.

* * * * *